US012679272B2

(12) United States Patent
Kraus et al.

(10) Patent No.: US 12,679,272 B2
(45) Date of Patent: Jul. 14, 2026

(54) WINDSHIELD MOUNT

(71) Applicant: Gentex Corporation, Zeeland, MI (US)

(72) Inventors: Andreas Kraus, Bad Friedrichshall (DE); Alexander K. Stapf, Neckarsulm (DE)

(73) Assignee: GENTEX CORPORATION, Zeeland, MI (US)

( * ) Notice: Subject to any disclaimer, the term of this patent is extended or adjusted under 35 U.S.C. 154(b) by 126 days.

(21) Appl. No.: 18/532,162

(22) Filed: Dec. 7, 2023

(65) Prior Publication Data

US 2024/0190344 A1     Jun. 13, 2024

Related U.S. Application Data

(60) Provisional application No. 63/386,952, filed on Dec. 12, 2022.

(51) Int. Cl.
B60R 1/04 (2006.01)
(52) U.S. Cl.
CPC ..................................... B60R 1/04 (2013.01)
(58) Field of Classification Search
CPC ....................................................... B60R 1/04
USPC ...................................... 248/220.21, 221.11
See application file for complete search history.

(56) References Cited

U.S. PATENT DOCUMENTS

| | | | | |
|---|---|---|---|---|
| 4,645,316 A * | 2/1987 | Ohyama | ................... | B60R 1/04 |
| | | | | 359/872 |
| 6,447,127 B1 * | 9/2002 | Yoshida | .................... | B60R 1/04 |
| | | | | 359/872 |
| 8,456,311 B2 * | 6/2013 | Wohlfahrt | ............ | G01D 11/245 |
| | | | | 73/170.17 |
| 9,244,249 B2 * | 1/2016 | Kim | .......................... | B60R 1/04 |
| 2015/0022913 A1 * | 1/2015 | Minikey, Jr. | ............ | B60R 11/04 |
| | | | | 359/872 |
| 2019/0176701 A1 * | 6/2019 | Kremkow | ................. | B60R 1/12 |

FOREIGN PATENT DOCUMENTS

| | | | | | |
|---|---|---|---|---|---|
| CN | 102033283 B | * | 3/2014 | ............ | H04N 23/55 |
| CN | 113147599 A | * | 7/2021 | ............... | B60R 1/04 |
| DE | 3515116 A | * | 10/1986 | | |
| GB | 1222813 A | * | 2/1971 | ............... | B60R 1/04 |
| GB | 1326740 A | * | 8/1973 | ............... | B60R 1/04 |
| KR | 97038150 A | * | 7/1997 | | |

* cited by examiner

*Primary Examiner* — Kimberly T Wood
(74) *Attorney, Agent, or Firm* — Price Heneveld LLP; Brian James Brewer

(57) ABSTRACT

A windshield mount for a rearview mirror assembly includes a supporting ring that defines an outer supporting perimeter and an inner supporting perimeter. The inner supporting perimeter defines an aperture. A button defines an outer button perimeter and the button is located in the aperture. A space is defined between the inner supporting perimeter and the outer button perimeter. An adhesive is within the space to secure the supporting ring to the button.

17 Claims, 6 Drawing Sheets

WINDSHIELD MOUNT

CROSS-REFERENCE TO RELATED APPLICATION

This application claims priority to and the benefit under 35 U.S.C. § 119(e) of U.S. Provisional Application No. 63/386,952, filed on Dec. 12, 2022, entitled "WINDSHIELD MOUNT," the disclosure of which is hereby incorporated herein by reference in its entirety.

FIELD OF THE DISCLOSURE

The present disclosure generally relates to a windshield mount, and, more particularly, to a windshield mount for a rearview mirror assembly.

SUMMARY OF THE DISCLOSURE

According to an aspect of the present disclosure, a windshield mount for a rearview mirror assembly includes a supporting ring that defines an outer supporting perimeter and an inner supporting perimeter. The inner supporting perimeter defines an aperture. A button defines an outer button perimeter, and the button is located in the aperture. A space is defined between the inner supporting perimeter and the outer button perimeter. An adhesive is within the space to secure the supporting ring to the button.

According to another aspect of the present disclosure, a windshield mount for a rearview mirror assembly includes a supporting ring defining an outer supporting perimeter and an inner supporting perimeter. The inner supporting perimeter defines an aperture and a first anti-rotation member. A button is configured to be connected to a mounting member of a rearview mirror assembly. The button defines an outer button perimeter defining a second anti-rotation member that is engaged with the first anti-rotation member, and the button is located in the aperture.

According to yet another aspect of the present disclosure, a windshield mount for a rearview mirror assembly includes a supporting ring defining an outer supporting perimeter and an inner supporting perimeter. The inner supporting perimeter defines a plurality of spacer teeth. A button is configured to be connected to a mounting member of a rearview mirror assembly and is located in the aperture. The button defines an outer button perimeter. A space is between the inner supporting perimeter and the outer button perimeter defined by the spacer teeth.

These and other features, advantages, and objects of the present disclosure will be further understood and appreciated by those skilled in the art by reference to the following specification, claims, and appended drawings.

DETAILED DESCRIPTION

Figure 1:
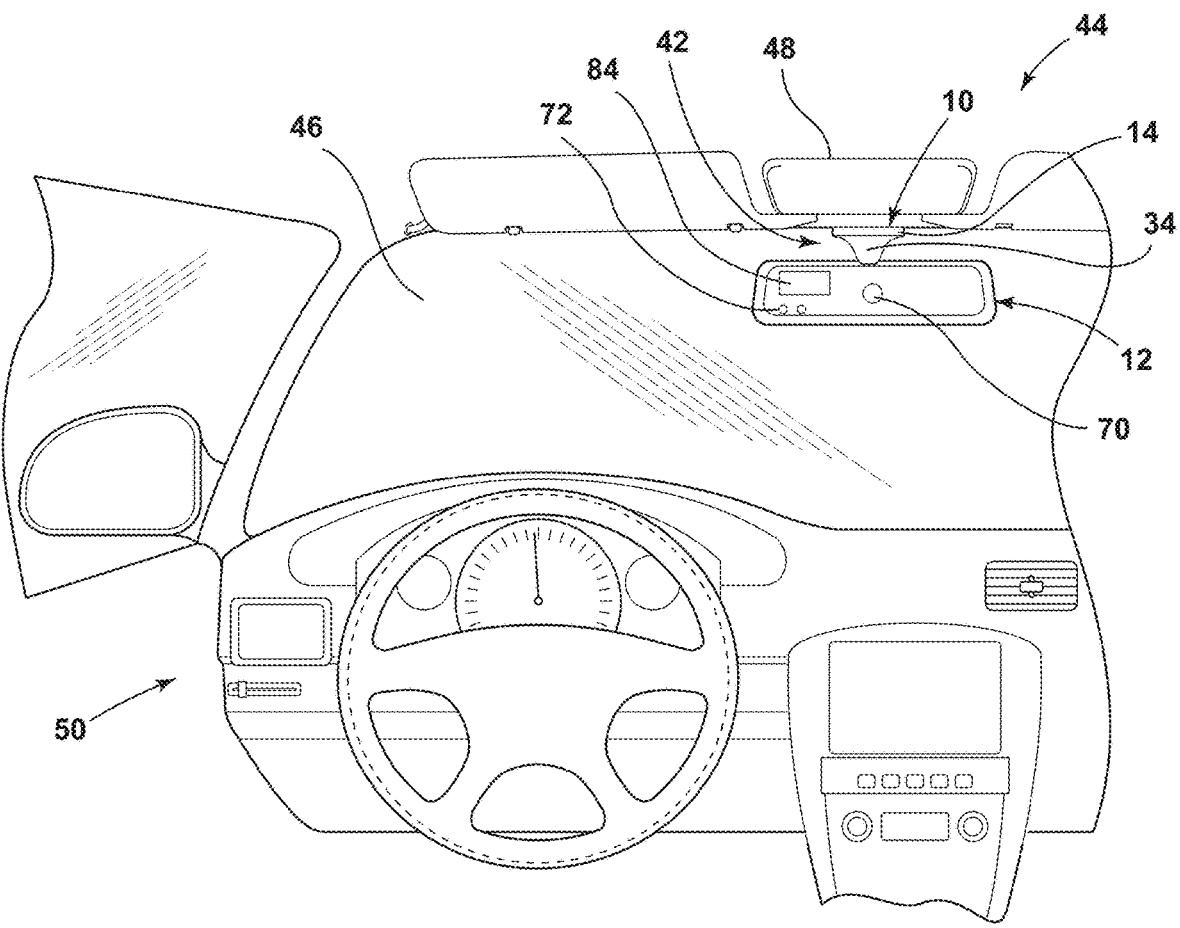
FIG. 1 is an interior view of a vehicle that incorporates a windshield mount for a rearview mirror assembly in accordance with an aspect of the present disclosure.

The present illustrated embodiments reside primarily in combinations of method steps and apparatus components related to a windshield mount for a rearview mirror assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
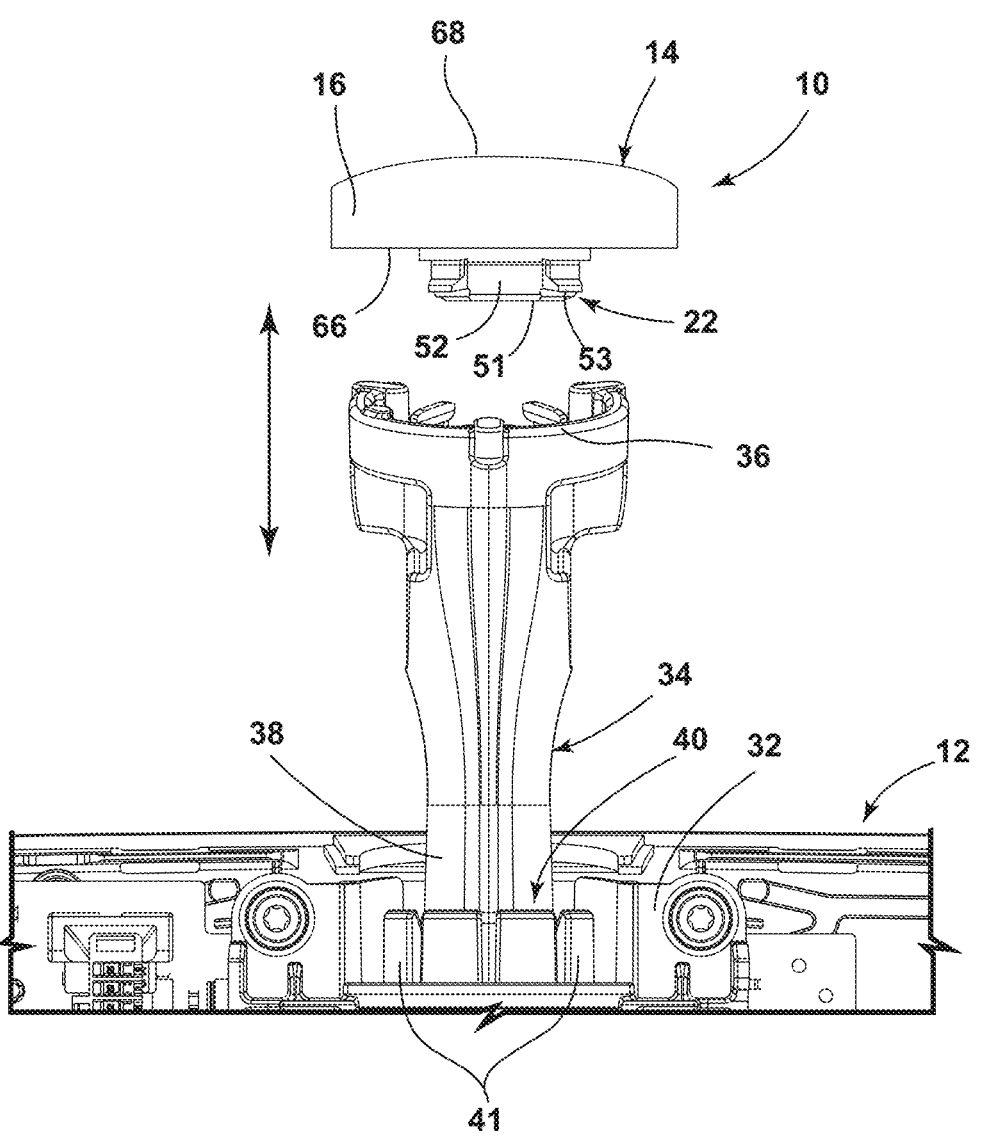
FIG. 2 is a top perspective view of a windshield mount for a rearview mirror assembly in accordance with an aspect of the present disclosure.
Figure 3:
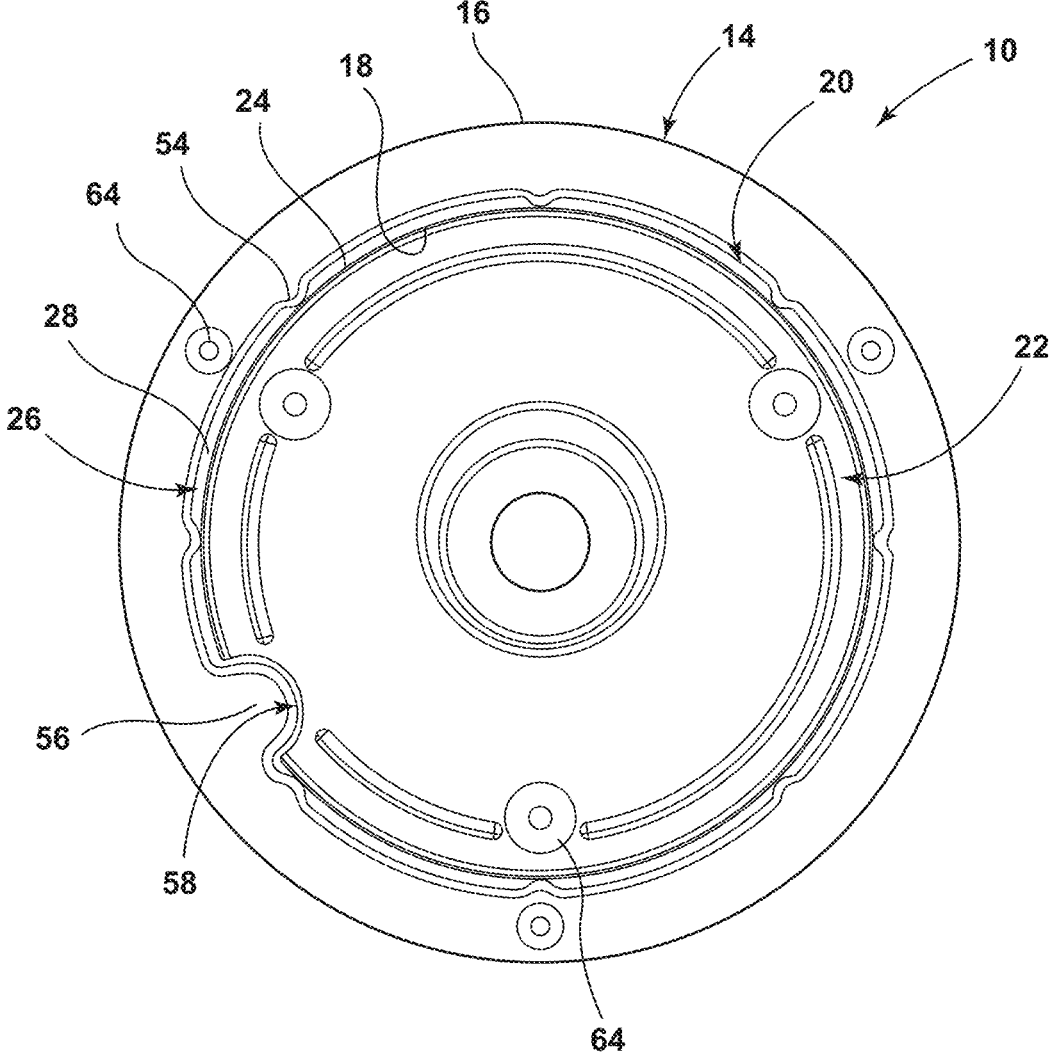
FIG. 3 is a top plan view of a windshield mount for a rearview mirror assembly in accordance with an aspect of the present disclosure.
Figure 4:
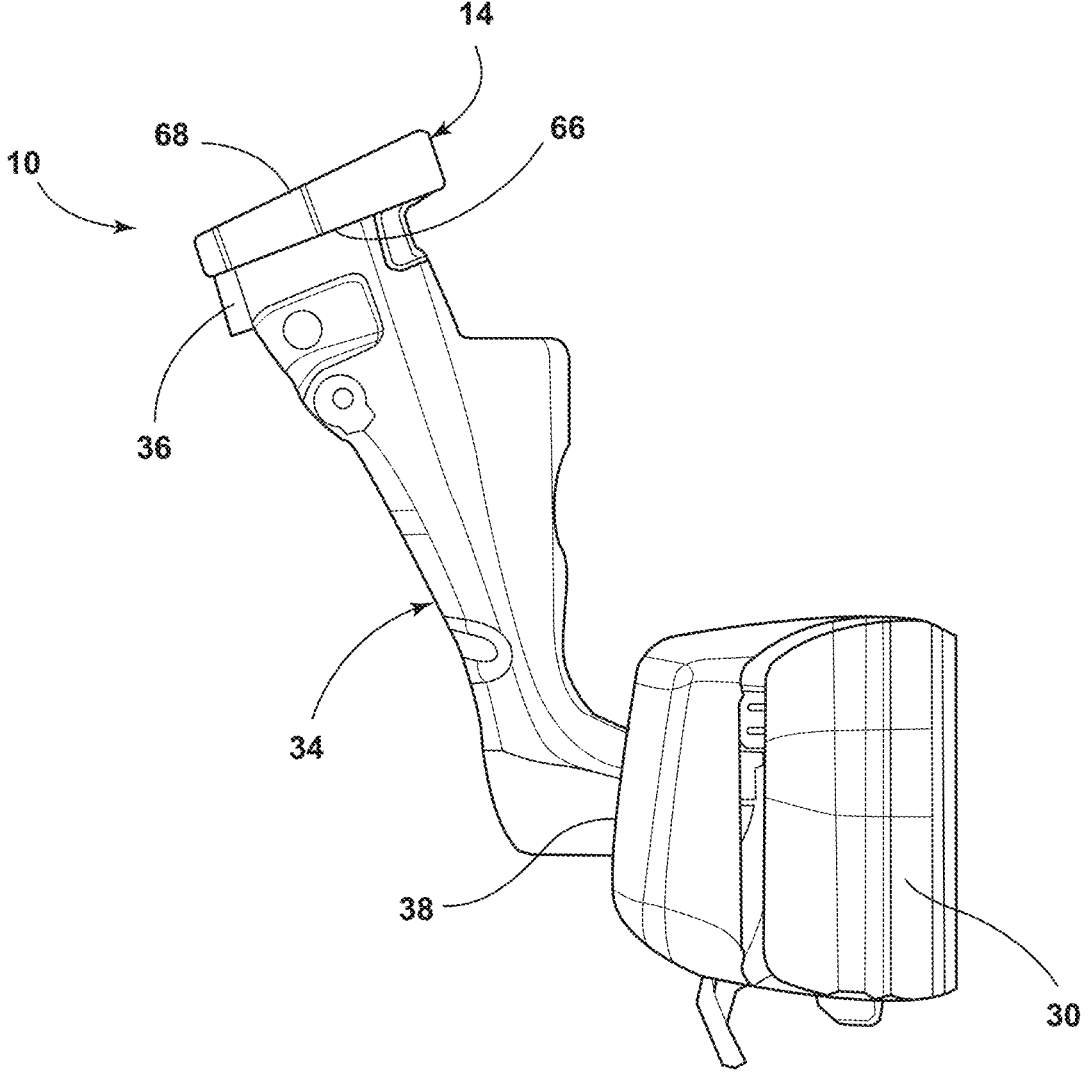
FIG. 4 is a side view of a windshield mount for a rearview mirror assembly in accordance with an aspect of the present disclosure.
Figure 5B:
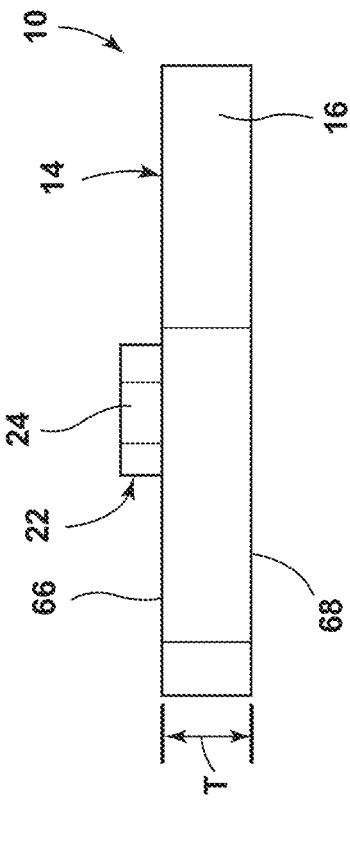
FIG. 5B is a side view of a windshield mount having a uniform thickness in accordance with an aspect of the present disclosure.
Figure 5A:
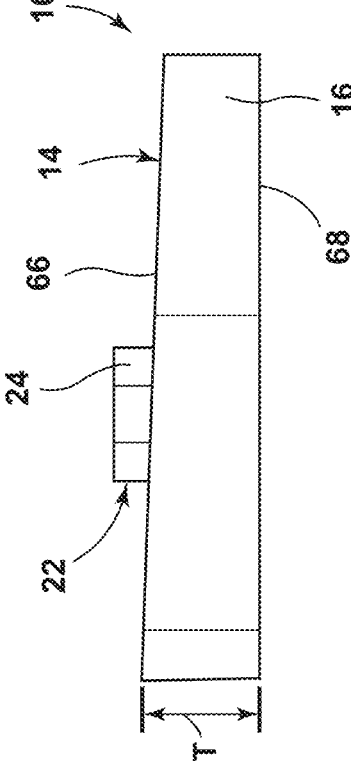
FIG. 5A is a side view of a windshield mount having a non-uniform thickness in accordance with an aspect of the present disclosure.

Referring to FIGS. 1-6, reference numeral 10 generally designates a windshield mount for a rearview mirror assembly 12. The windshield mount 10 includes a supporting ring 14 that defines an outer supporting perimeter 16 and an inner supporting perimeter 18 (FIG. 3). The inner supporting perimeter 18 defines an aperture 20. A button 22 defines an outer button perimeter 24, and the button 22 is located in the aperture 20. A space 26 is defined between the inner supporting perimeter 18 and the outer button perimeter 24. An adhesive 28 is within the space 26 to secure the supporting ring 14 to the button 22 (FIG. 3).

With reference now to FIGS. 1 and 2, the button 22 is configured to attach to the rearview mirror assembly 12.

More particularly, the rearview mirror assembly 12 includes a housing 30 and a mounting bracket 32 connected to the housing 30. A mounting member 34 extends between a first end 36 configured to attach to the button 22 and a connection end 38 connected to the mounting bracket 32. The connection end 38 forms a joint 40 with the mounting bracket 32 permitting relative articulation between the mounting bracket 32 and the mounting member 34. More particularly, the connection end 38 may be at least partially spherically shaped and the mounting bracket 32 may define a pocket for accommodating the connection end 38 such that the joint 40 is a ball-type joint. The mounting bracket 32 may include a series of fingers 41 defining the pocket that accommodates the connection end 38. The series of fingers 41 may be formed of a material with deformable memory such that the connection end 38 can be connected through linear pressure. An interior surface of the series of fingers 41 may be spherically shaped to correspond to ball-type joint. The button 22 is configured to connect to an overhead structure 42 of a vehicle 44. The overhead structure 42 of the vehicle 44 may include a front window 46 (e.g., a windshield), an upper panel 48, or other locations within an interior cabin 50 of the vehicle 44.

With reference now to FIGS. 2 and 3, the outer button perimeter 24 may define a shape (e.g., circular) that facilitates connection to the first end 36 of the mounting member 34. The button 22 may include a projection 51 configured to connect to the mounting member 34. The projection 51 may include a perimeter defining a regular or irregular polygonal shape comprising a series of straight sides 52. For example, the projection 51 may include six sides 52, with every other side 52 being equal in length but every adjacent side 52 being unequal in length. In some embodiments, at least one of the sides 52 includes a tab 53. In some embodiments, at least two sides 52 (e.g., every side 52, every other side 52, or sides 52 on two or more diametric sides 52) have one of the tabs 53. The tabs 53 include outwardly extending ramps that interface with the first end 36 of the mounting member 34. More particularly, the tabs 53 may be deformed outwardly during relative linear movement as the first end 36 is pushed into contact with the button 22 until a snap connection is formed.

The inner supporting perimeter 18 may define a shape that corresponds to the outer button perimeter 24 and sized large enough to insert the button 22 while accommodating the space 26 therebetween. More particularly, the inner supporting perimeter 18 may define a generally circular shape with an array of spacer teeth 54 that center the button 22 and make the space 26 substantially uniform. The array of spacer teeth 54 may be generally equally spaced around the inner supporting perimeter 18. In some embodiments, the array of spacer teeth 54 includes three or more spacer teeth 54, for example, four or more spacer teeth 54, five or more spacer teeth 54, six or more spacer teeth 54, seven or more spacer teeth 54, eight or more spacer teeth 54, or eight spacer teeth 54. The inner supporting perimeter 18 may define a first anti-rotation member 56, and the outer button perimeter 24 may define a second anti-rotation member 58 engaged with the first anti-rotation member 56. More particularly, the second anti-rotation member 58 may include a bay and the first anti-rotation member 56 may include a projection that is mated with the bay. However, in other embodiments, the second anti-rotation member 58 may include the projection and the first anti-rotation member 56 may include the bay that is mated with the projection. The first anti-rotation member 56 may extend radially inwardly further than the spacer teeth 54. The first and second anti-rotation members 56, 58 prevent relative rotation between the supporting ring 14 and the button 22. In this manner, the structure of the adhesive 28 can be maintained as the housing 30 is moved relative to the mounting member 34. The space 26 and the spacer teeth 54 may be minimally sized, for example, less than about 1 mm, about 0.5 mm, about 5 mm or less, or about 0.5 mm or more, or between about 1 mm and about 5 mm. The supporting ring 14 may be formed of a material, for example, a sintered-metal material, a machined aluminum material, a machined A380 material, a polyamide material (e.g., PAGF10-30), combinations thereof, or the like.

With reference now to FIGS. 3-5A, the outer supporting perimeter 16 of the supporting ring 14 may define a shape, for example, a circular shape, a polygonal shape, or other shapes. In some embodiments, the outer supporting perimeter 16 and the inner supporting perimeter 18 define a substantially circular shape. In this manner, a distance between the outer supporting perimeter 16 and the inner supporting perimeter 18 may be constant other than the spacer teeth 54 and the first anti-rotation member 56. One or more holes 64 (e.g., two or more, three or more, or four or more) may be defined between the aperture 20 and the outer supporting perimeter 16 to facilitate connection to the overhead structure 42 of the vehicle 44 and/or the mounting member 34. In some embodiments, an adhesive, such as the adhesive 28 is located in the holes 64, for example, when the windshield mount 10 is connected to the front window 46. In some embodiments, the holes 64 may be configured to receive a mechanical fastener, for example, when the windshield mount 10 is connected to the upper panel 48. The holes 64 may be equally spaced around the supporting ring 14 and/or button 22. Additional holes 64 may be located on the button 22 for similar functionality (e.g., receiving an adhesive and/or mechanical fastener).

With continued reference to FIGS. 3-5A, the supporting ring 14 includes a front surface 66 and a rear surface 68 defining a thickness ("T"). The thickness T may be inclined (FIGS. 4 and 5A) such that the thickness increases along the supporting ring 14. More particularly, the incline may be uniform (e.g., inclining at a constant rate) across the entire supporting ring 14 (e.g., the front surface 66 and/or the rear surface 68). In this manner, the rear surface 68 may be connected to the overhead structure 42 of the vehicle 44 and the front surface 66 is oriented towards a viewer at a different angle than the overhead structure 42 of the vehicle 44 (e.g., the front window 46). During assembly, the thickest portion of the supporting ring 14 may be oriented toward a roof of the vehicle 44 (FIG. 4) or a floor of the vehicle 44 depending on a desired default orientation of the housing 30 and a viewing surface of the rearview mirror assembly 12. The default orientation may be defined as an orientation of the joint 40 that permits the greatest flexibility in articulation in each direction. In other words, the default orientation is opposite of the joint 40 being maximally articulated. However, in some embodiments, the thickness T may be uniform (FIG. 5B). The button 22 may have a similar (e.g., substantially the same) thickness to the supporting ring 14. For example, the button 22 may have an inclined thickness or a uniform thickness and the projection 51 extends from the thickness of the button 22 and past the supporting ring 14. The thickness T of the supporting ring 14 and the button 22 may define the extension and angle of the mounting member 34 when connected to the overhead structure 42.

With reference to FIGS. 1-6, the windshield mount 10 and, more particularly, the supporting ring 14 may, therefore, add additional support to and orientate (e.g., by the mounting member 34) the rearview mirror assembly 12. For example, the rearview mirror assembly 12 may be configured as a full display rearview mirror assembly with driver monitoring functionalities including a camera 70 and a light source 72 (FIG. 1). The components in the full display rearview mirror assembly may add weight requiring additional support. Likewise, the mounting member 34 may be selected from a plurality of mounting members of varying lengths, sizes, and shapes. As such, a mounting member 34 that is longer and/or a rearview mirror assembly 12 that is heavier (e.g., with full display capabilities) may benefit from the additional support provided by the supporting ring 14. In this manner, the supporting ring 14 can be configured as a non-integral, supporting component to the button 22 and be provided during assembly as needed without further modification. Similarly, the outer supporting perimeter 16 can vary in size and shape to accommodate a variety of rearview mirror assemblies. In some embodiments, the mounting member 34 connects through a rear of the housing 30. In this manner, the mounting member 34 may include an angle (FIG. 4) that orientates the rearview mirror assembly 12.

Figure 6:
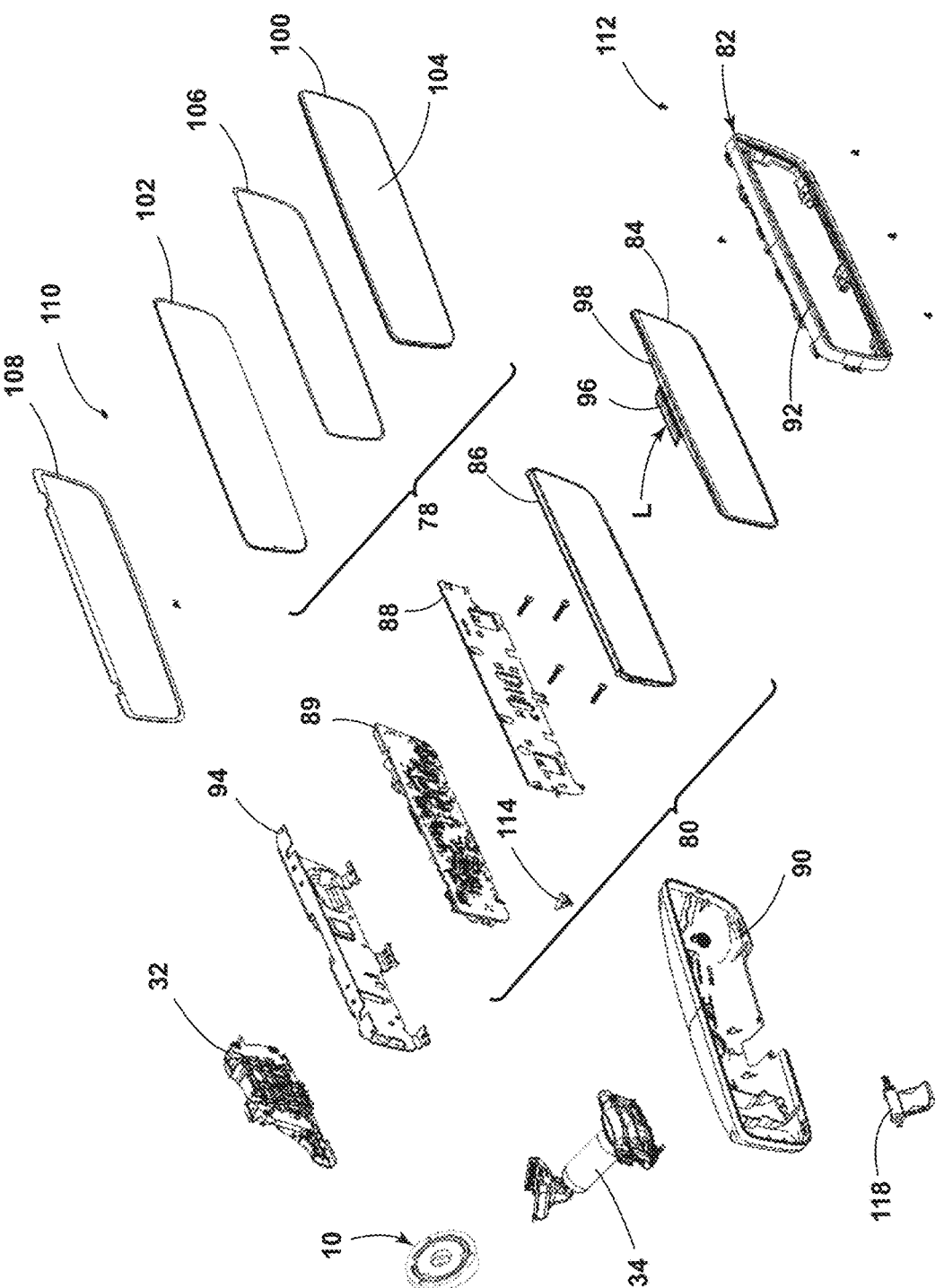
FIG. 6 is a disassembled top perspective view of a rearview mirror assembly and a windshield mount in accordance with an aspect of the present disclosure.

With reference now to FIG. 6, the rearview mirror assembly 12 may include a partially reflective, partially transmissive element 78 (also referred to as a "glass element" herein) and a display assembly 80 that is viewed through the partially reflective, partially transmissive element 78. The rearview mirror assembly 12 further includes a bezel 82 that shields and supports the partially reflective, partially transmissive element 78 and the display assembly 80. The mounting member 34 may extend rearward from the bezel 82. The bezel 82 may be configured to be part of the outer profile of the partially reflective, partially transmissive element 78.

With continued reference to FIG. 6, the display assembly 80 may comprise several components, including a display 84, an optic block 86, a heat sink 88, and a printed circuit board ("PCB") 89. The housing 30 may include a rear housing 90, a front shield 92, and an intermediate shield 94 which shield and support the partially reflective, partially transmissive element 78 and the display assembly 80. The rear housing 90, the intermediate shield 94, the front shield 92, and components of the display assembly 80 include various retaining features to operably connect the several components of the display assembly 80 with the rear housing 90, the intermediate shield 94, the front shield 92, the bezel 82, and each other, and to provide support to the display assembly 80. Specifically, the rear housing 90 includes retaining features to operably connect the rear housing 90 to the intermediate shield 94 and the intermediate shield 94 includes retaining features to operably connect the display assembly 80. The bezel 82 and the front shield 92, likewise, have retaining features to operably connect the bezel 82 and the front shield 92 to the display assembly 80. The retaining features generally include snap-fit connections, tab and slot connections, screw connections, and/or other known retaining features. In some embodiments, the intermediate shield 94 or other portions of the rearview mirror assembly 12 may include an ambient light sensor (not shown).

The display 84 may be a liquid crystal display (LCD), a light-emitting diode (LED), an organic light-emitting diode (OLED), plasma, digital light processing (DLP), or other display technology. The display 84 further includes a flexible electrical connector 96, which is operably mechanically and electrically connected with the PCB 89. The flexible electrical connector 96 has a length "L" that is sufficient to extend over and wrap around the display module components between the display 84 and the PCB 89, and has a width which extends substantially along a top edge 98 of the display 84. The ends of the flexible electrical connector 96 may be chamfered to ease assembly. The flexible electrical connector 96, when operably coupled to the PCB 89, aids in securing the components along a top edge 98 of the display assembly 80.

The glass element 78 may include an electro-optic medium, which may include a prism-type construction or an electrochromic-type construction. In the prism-type construction, the electro-optic medium may generally include one glass element 78 having a varying thickness from top to bottom. The glass element 78 includes at least two glass substrates, which may include a front substrate 100 as well as a rear substrate 102. The front substrate 100 may include a first surface and a second surface, and the rear substrate 102 may include a third surface and a fourth surface. The electro-optic medium may be disposed between the front substrate 100 and the rear substrate 102. The rearview mirror assembly 12 has a viewing area 104 disposed on a front surface of the front substrate 100. The viewing area 104 may be a rectangular shape, a trapezoidal shape, or any custom contoured shape for utilitarian and aesthetic purposes. A border of the glass element 78 may incorporate a concealing layer 106 or edge treatment, such as a chrome ring, an opaque ring, or other similar finish, to conceal a peripheral area of the rear housing 90, the intermediate shield 94, and other elements located behind the glass element 78. A foam adhesive 108 may be connected to an inner side of the glass element 78. A pair of J-clips 110 (or other types of conductors) may electrically couple the glass element 78 to the PCB 89. In the electrochromic-type construction, the electro-optic medium may be an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity changes from a first phase to a second phase. During assembly, mechanical fasteners 112 may connect the components of the rearview mirror assembly 12.

A glare sensor optic 114 may be provided to the bottom side of the rear housing 90, in a location which receives light below the glass element 78 and below the display 84. The glare sensor optic 114 receives light from headlamps of a trailing vehicle, and measures information regarding the likely glare visible on the glass element 78 and communicates this information to the rearview mirror assembly 12 so that the rearview mirror assembly 12 can be optimized to allow viewing of the display 84 through the glass element 78 and or reducing glare from the glass element 78. The outer perimeter of the display 84 may be located within an outer perimeter of the glass element 78. The glare sensor optic's 114 optical vertical/horizontal pattern may be symmetrical, so that orientation of the glare sensor optic 114 is not significant (e.g., a circular geometry). The glare sensor optic 114 could also have an asymmetrical vertical/horizontal light gathering pattern, in which case a keyed feature would be put into the lens to verify correct orientation in the rearview mirror assembly 12. The glare sensor optic 114 could also be packaged at least partially within the bezel 82 of the rearview mirror assembly 12 and have a light guide which is configured to propagate light to the glare sensor optic 114. The glare sensor optic 114 could also be an imager on a rear portion of the vehicle 44, where a signal representative of the received light is communicated from the glare sensor optic 114 to the rearview mirror assembly 12. In some embodiments, the glare sensor optic 114 may include a full display mirror ("FDM") camera and image processing by components on the PCB 89. An actuator device 118 tilts the glass element 78 relative to the vehicle 44 and/or the rear housing 90.

The disclosure is further summarized in the following paragraphs and is further characterized by combinations of any and all of the various aspects described therein.

According to an aspect of the present disclosure, a windshield mount for a rearview mirror assembly includes a supporting ring that defines an outer supporting perimeter and an inner supporting perimeter. The inner supporting perimeter defines an aperture. A button defines an outer button perimeter and the button is located in the aperture. A space is defined between the inner supporting perimeter and the outer button perimeter. An adhesive is within the space to secure the supporting ring to the button.

According to another aspect, an inner supporting perimeter defines a first anti-rotation member and an outer button perimeter defines a second anti-rotation member and that is engaged with the first anti-rotation member.

According to yet another aspect, the second anti-rotation member includes a bay.

According to another aspect, the first anti-rotation member includes a projection mated with the bay.

According to yet another aspect, an inner supporting perimeter defines a plurality of spacer teeth.

According to another aspect, a supporting ring includes a top surface and a bottom surface defining a thickness.

According to yet another aspect, a thickness of a supporting ring is inclined.

According to still another aspect, an incline has a constant rate across an entire supporting ring.

According to another aspect, a thickness of a supporting ring is uniform.

According to another aspect of the present disclosure, a windshield mount for a rearview mirror assembly includes a supporting ring defining an outer supporting perimeter and an inner supporting perimeter. The inner supporting perimeter defines an aperture and a first anti-rotation member. A button is configured to be connected to a mounting member of a rearview mirror assembly. The button defines an outer button perimeter defining a second anti-rotation member that is engaged with the first anti-rotation member, and the button is located in the aperture.

According to another aspect, a first anti-rotation member includes a projection and a second anti-rotation member includes a bay mated with the projection.

According to yet another aspect, a supporting ring includes a top surface and a bottom surface defining a thickness.

According to still yet another aspect, a thickness of a supporting ring is inclined.

According to another aspect, a thickness of a supporting ring is uniform.

According to yet another aspect, a space is defined between an inner supporting perimeter and an outer button perimeter and an adhesive is within the space securing a supporting ring to a button.

According to yet another aspect of the present disclosure, a windshield mount for a rearview mirror assembly includes a supporting ring defining an outer supporting perimeter and an inner supporting perimeter. The inner supporting perimeter defines a plurality of spacer teeth. A button is configured to be connected to a mounting member of a rearview mirror assembly and is located in the aperture. The button defines an outer button perimeter. A space is between the inner supporting perimeter and the outer button perimeter defined by the spacer teeth.

According to another aspect, a supporting ring includes a top surface and a bottom surface defining a thickness.

According to yet another aspect, a thickness of a supporting ring is inclined.

According to still yet another aspect, a thickness of a supporting ring is uniform.

According to another aspect, an adhesive is within a space securing a supporting ring to a button.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A windshield mount for a rearview mirror assembly, the windshield mount comprising:
   a supporting ring defining an outer supporting perimeter and an inner supporting perimeter, the inner supporting perimeter defining an aperture and a first anti-rotation member;
   a button defining an outer button perimeter defining a second anti-rotation member and that is engaged with the first anti-rotation member, the button located in the aperture and defining a connection projection configured to couple to a mounting member of a rearview mirror assembly;
   a space between the inner supporting perimeter and the outer button perimeter; and
   an adhesive within the space securing the supporting ring to the button.

2. The windshield mount of claim 1, wherein the first anti-rotation member includes a projection extending inwardly towards the outer button perimeter.

3. The windshield mount of claim 2, wherein the second anti-rotation member includes a bay mated with the projection.

4. The windshield mount of claim 2, wherein the inner supporting perimeter defines a plurality of spacer teeth that extend inwardly towards the outer button perimeter a smaller distance than the projection, and the adhesive is located between the spacer teeth.

5. The windshield mount of claim 1, wherein the supporting ring includes a top surface and a bottom surface defining a thickness.

6. The windshield mount of claim 5, wherein the thickness is inclined.

7. The windshield mount of claim 6, wherein the incline has a constant rate across an entirety of the supporting ring.

8. The windshield mount of claim 5, wherein the thickness is uniform.

9. A windshield mount for a rearview mirror assembly, the windshield mount comprising:
   a supporting ring defining an outer supporting perimeter and an inner supporting perimeter, the inner supporting perimeter defining an aperture and a first anti-rotation member;
   a button defining a connection projection configured to be connected to a mounting member of a rearview mirror assembly, the button defining an outer button perimeter defining a second anti-rotation member that is engaged with the first anti-rotation member, the button located in the aperture; and
   wherein the inner supporting perimeter defines a plurality of spacer teeth extending inwardly towards the outer button perimeter that centers the button within the aperture and a space is defined between the inner supporting perimeter and the outer button perimeter by the plurality of spacer teeth and an adhesive is within the space securing the supporting ring to the button.

10. The windshield mount of claim 9, wherein the first anti-rotation member includes a projection extending a greater inward distance than the plurality of spacer teeth and the second anti-rotation member includes a bay mated with the projection.

11. The windshield mount of claim 9, wherein the supporting ring includes a substantially planar top surface and a substantially planar bottom surface defining a thickness.

12. The windshield mount of claim 11, wherein the thickness is inclined.

13. The windshield mount of claim 11, wherein the thickness is uniform.

14. A windshield mount for a rearview mirror assembly, the windshield mount comprising:
   a supporting ring defining an outer supporting perimeter and an inner supporting perimeter, the inner supporting perimeter defining a plurality of spacer teeth extending inwardly;
   a button configured to be connected to a mounting member of the rearview mirror assembly and is located in the aperture, the button defining an outer button perimeter; and
   a space between the inner supporting perimeter and the outer button perimeter uniformly defined by the spacer teeth and an adhesive is within the space securing the supporting ring to the button.

15. The windshield mount of claim 14, wherein the supporting ring includes a top surface and a bottom surface defining a thickness.

16. The windshield mount of claim 15, wherein the thickness is inclined.

17. The windshield mount of claim 15, wherein the thickness is uniform.

* * * * *